Jan. 18, 1949.  E. E. HARPER  2,459,700
CONTROL VALVE
Filed June 7, 1944
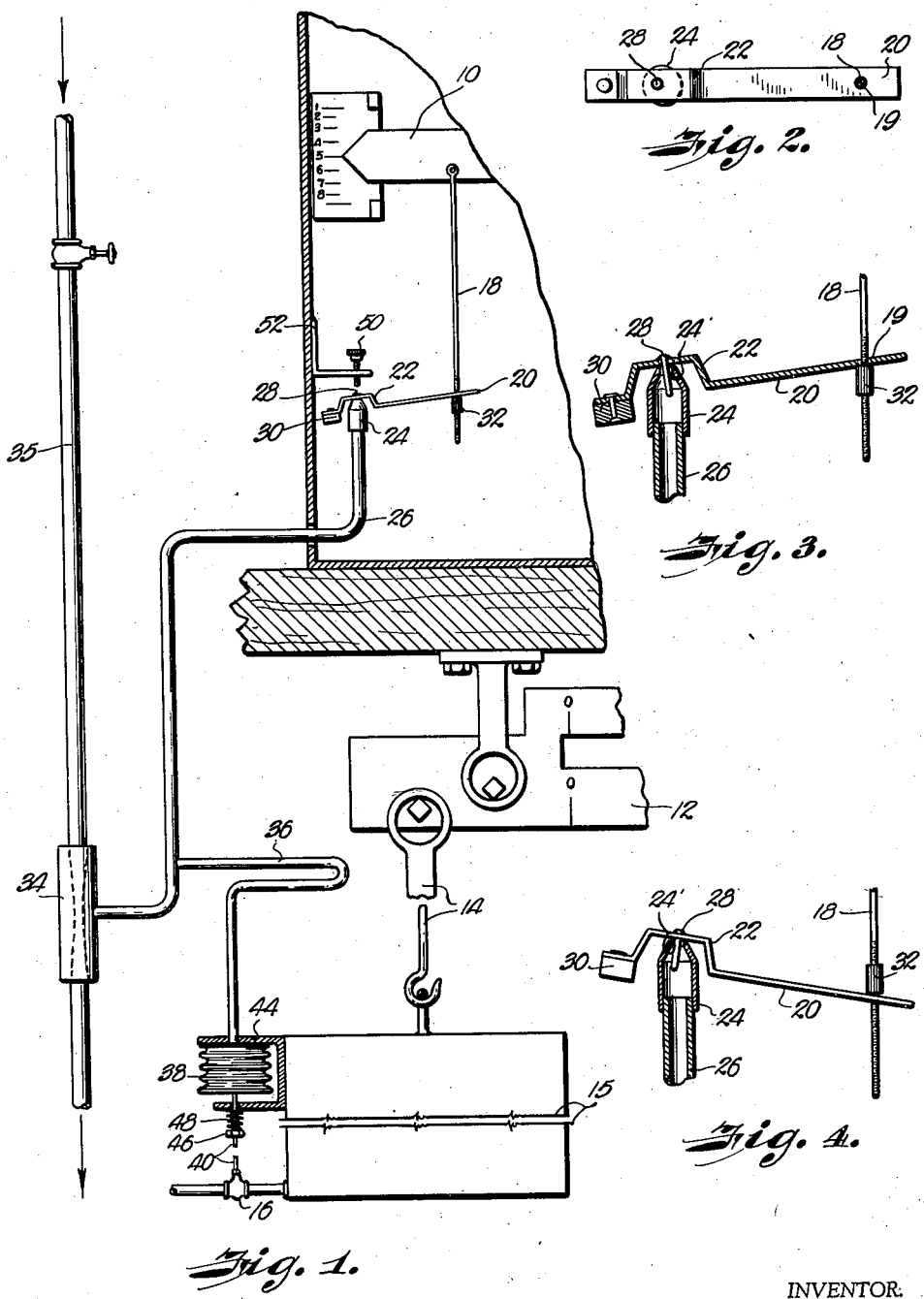
INVENTOR:
Elmer E. Harper,
BY Chas W Gerard
ATTORNEY Patented Jan. 18, 1949

2,459,700

UNITED STATES PATENT OFFICE 2,459,700

CONTROL VALVE

Elmer E. Harper, Monrovia, Calif.; Esther Pardee Harper executrix of Elmer E. Harper, deceased Application June 7, 1944, Serial No. 539,049

2 Claims. (Cl. 251—126)

This invention has reference to control or regulating appliances, in that class of devices which are responsive to control conditions and in turn are adapted to transmit appropriate regulating action to other appliances for the purpose of modifying the operation thereof in accordance with certain given or set conditions of control.

It is therefore one important object of the invention to provide improved control means of the character stated and comprising a control element which is directly responsive to primary control conditions or actuations, and also operative as a means of transmitting appropriate regulating action to other control or regulative appliances, and with a minimum of reactive influence tending to disturb the sensitiveness of the operation of the primary control mechanism.

As one practical form of embodiment of my invention I have devised a control arrangement and construction in which a control element is made responsive to the control conditions and is actuated thereby in such a manner as to impress a control or regulating function upon a pneumatic actuating means connected with the mechanism or devices to be controlled and thereby correspondingly regulate the latter in response to the action of said control element.

In the actual embodiment of this form of construction the control element takes the form of a valve of a peculiarly sensitive type adapted for delicate response to the primary control means, and by such response modifying the vacuum action developed in the air connections to the pneumatic operating means already referred to and thus accomplishing the desired regulating function.

Incidentally it is also an object of my invention to provide a novel control valve of the improved delicately sensitive character referred to, and peculiarly well adapted to fulfill requirements where a minimum of mechanical operative effort is essential for transmitting the control action.

With the foregoing general objects in view, I will now describe the construction and operation of my invention by reference to the accompanying drawing illustrating one practical form of embodiment of the same, after which those features and combinations deemed to constitute patentable subject matter will be particularly set forth and claimed.

In the drawing—

Figure 1 is a sectional elevation illustrating one form of control apparatus embodying the operative features and including the novel control appliance of the present invention;

Figure 2 is a plan view of said appliance, on a larger scale;

Figure 3 is a sectional elevation of the same, and illustrating the appliance in the same operative relationship as shown in Figure 1; and Figure 4 is a similar sectional elevation of said control appliance or valve, arranged in a different operative relationship.

Prevailing types of regulating mechanism of the type to which the present invention is most directly related include some form or other of control linkage or transmission means for transmitting the regulating function, and the principal fault to be found with such apparatus is the disproportionate amount of mechanical effort required for the operation of such linkage for transmitting the regulating function, because this necessarily restricts the freedom of operation of the control element and its connections, and hence to the same degree adversely affecting the sensitivity of the control function. The purpose of my present improvements, therefore, is to provide a control structure making use of a control element which will be sufficiently delicate in its operation to satisfy all the requirements of the control function while at the same time requiring a minimum of mechanical effort for its operation whereby the sensitivity of the control mechanism is not appreciably affected.

Referring now to the accompanying drawing, I have selected, as an example of an appropriate embodiment of the improved control structure, certain parts of an automatic measuring mechanism, such as apparatus for feeding predetermined quantities of certain materials for a given purpose, as required, for example, in the adding of chemical materials to water in water purification systems. One type of such apparatus is illustrated more fully in my application Serial No. 535,975, filed May 17, 1944. The parts of the apparatus herein illustrated comprise a balanced control beam 10 which is subjected to unbalancing means at a predetermined and controlled rate—as, for example, by being subjected to unbalancing impulses at such predetermined rate, which impulses are simultaneously transmitted to the weighing beam 12 of a scales mechanism supporting (as by connections 14) a receptacle 15 containing the material to be measured and dispensed by feeding means, such as a discharge valve 16—all as more fully described in my aforesaid copending application.

One end of the control beam 10 is illustrated as provided with a suitable connection 18 to an arm 20 of a rocker valve of thin metal or the like, the body portion 22 of which is shown as of inverted U-shape for flatwise engagement (when in what may be termed valve-closed position) with the mouth 24' of a thin-edged air orifice structure 24 provided at the entrance to an air choke or vent tube 26. A pin 28 depending from the center of the body portion 22 of the valve serves to maintain the same in approximately central position over said orifice 24, the shape of the body portion of the valve being designed to bring its center of gravity below the mouth or vent opening 24'; and to help counterbalance the arm 20 a small mass of weight material 30 (e. g. solder) may be applied to the opposite side of said body portion 22 with relation to said arm, thereby promoting efficient valve-closing action on lowering of the connection 18 in response to the control operation of the beam 10. The arm 20 of the valve is shown as resting on a nut 32 which is adjustably mounted on said link connection 18, although a reverse arrangement of said valve and nut may be employed, as hereinafter explained.

The air choke or vent tube 26 communicated with an air eductor device 34 included as part of a water feed line 35; and said tube 26 further communicates with a flexible tube or hose 36 which connects with a Sylphon type of bellows device 38 having an operative connection 40 with the valve 16. The bellows device 38 may be supported by means of a bracket or the like 44 attached to the receptacle 15; and between this bracket and an adjustable nut 46 on the operating connection 40 is mounted a coil spring 48 for the purpose of maintaining the valve 16 normally in closed position (as regards any discharge of material from the receptacle 15). This is the relationship corresponding to such a position of the control connections as will allow no more than a negligible or inoperative vacuum to be produced or maintained in the tube 26 and the bellows device 38.

The operative connection between the valve 22 and the control member 10 is such that movements of the latter will raise or lower the arm 20 and thereby rock the valve into differently tilted positions upon the orifice element 24, thus varying the opening and closing action of the valve for correspondingly varying the vent action through said orifice and the choke tube 26. In other words, when the control beam 10 is depressed, its connection to the valve 22 allows said valve to settle into a more nearly horizontal or valve-closing position, and to that extent chokes the air-venting action through said tube 26, which results in more air being withdrawn from the tube 36 and bellows device 38 and thus produces an opening movement of the valve 16, which in the illustrated type of apparatus is the character of control or regulating action designed to follow as a result of the fluctuating movements of the control member 10. On the other hand, in the case of lifting movements of said control member, which will obviously lift the arm of the valve and thereby rock it into wider-open position with relation to the orifice 24, this will result in a freer air venting action, so that the air flow through the tube 26 is correspondingly increased and less air will be withdrawn from the tube 36 and bellows device 38, representing therefore a diminishing vacuum action, and in consequence an automatic closing movement of the valve 16 will take place as the opposite phase of the regulating action designed to be produced by operation of the control means.

With the present improved type of valve 22 and the valve-supporting seat therefor, it will be observed that in all positions of the valve (with the exception of its strictly horizontal position, representing the completely closed state of the valve), it maintains a substantially tangential contact with only one side of the vent orifice, or a single point of the sharp edge or rim defining said orifice opening 24'. Hence the operative, or opening or closing, action of the valve takes place as a rocking movement of the valve about said edge point of the orifice as a fulcrum, as the arm of the valve is lifted or lowered by the connection 18 to the control member 10. In such action the valve executes a hingelike movement, which opens or closes the orifice at the opposite side from said fulcrum point of the valve. Having a floating support upon the orifice structure, the point of fulcrum support may shift laterally to some extent while still maintaining a single point of fulcrum action with reference to said edge of the orifice; and due to such type of hingelike movement and the thin edge form of support for the valve, its operative movements are executed by means of a minimum amount of mechanical effort transmitted from the control member 10, as compared with that required for effecting movement of a valve bodily into and out of complete engagement with its valve seat or opening.

Moreover it will be noted that by means of the improved type of valve, the opportunity for friction is also reduced to a minimum, and that its operation is much less likely to be interfered with by sticking or the like.

Referring to the connection between the link 18 and arm 20 of the valve, it may be explained that said link has free sliding movement through the opening 19 of said arm, so that on lowering of the valve into horizontal or completely closed position over the orifice 24, any further downward movement of the control member 10 will effect mere sliding movement of the link through said opening 19, without any further action on the valve until the arm 20 is again engaged by the nut 32 in response to the reverse or upward movement of said control member.

Figure 4 merely illustrates an alternative arrangement of the parts in which the connection between the control member and the valve is modified for the purpose of reversing the operative action of the valve in response to the control movements, i. e., to impart opening movements to the valve in response to lowering movements of the control member, and vice versa to impart closing movements to the valve in response to the reverse movements of said control member. For this purpose the nut 32 is mounted on the link 18 above the arm 20 of the valve, with the latter arranged in reversely tilted position over the orifice 24, as compared with the arrangement illustrated in Figure 1, in which relation it is obvious that operative movement of the several parts will take place in the manner just described, the nut engaging and imparting opening movements to the valve 22 in the downward movements of the control member 10 but allowing the valve to gradually close on rising movements of said control member and the link 18 simply sliding freely through the opening 19 of the valve arm in case of any further upward movement of the control member after the valve has settled into completely closed position. The principle of the operation is therefore essentially the same as in the arrangement first described.

As a guard against any casual displacement of the valve from its operative position over the orifice structure 24, an adjustable stop element may be provided in the form of a screw 50 mounted in a bracket 52 adjacent to the orifice structure, with the tip of said screw in closely overhanging relation above the body portion 22 of the valve, but at a sufficient distance therefrom for permitting all normal operative movements of the valve.

It will therefore be seen that I have devised a practical and efficient type of control device and connections therefor, for fulfilling all the desired objects of my invention; and while I have shown and described both practical and satisfactory forms of construction and arrangement I desire to be understood as expressly reserving the right to such changes or modifications as may fairly fall within the scope of the appended claims.

Having thus described my invention, what I claim and desire to secure by Letters Patent is:

1. A valve construction comprising, a valve seat having a thin edge defining an upwardly facing valve orifice, a rocking valve having operative floating movement over said orifice and formed with a flat body portion provided with depending counterweight means operative to maintain said body portion in fulcruming engagement with said thin edge at one side of the orifice, and an operating arm forming a rigid extension from said body portion and projecting therefrom along a line substantially below the level of said orifice.

2. A valve construction comprising, in combination with a valve seat having a thin edge defining an upwardly facing valve orifice, a rocking valve member having a U-shaped body movable in hoodlike relation over said orifice and in fulcruming engagement with said thin edge at one side of the orifice, one side of said body having a rigid extension forming an operating arm projecting along a line substantially below the level of said orifice.

ELMER E. HARPER.

REFERENCES CITED

The following references are of record in the file of this patent:

UNITED STATES PATENTS

| Number | Name | Date |
| --- | --- | --- |
| 649,641 | Kummer | May 15, 1900 |
| 869,323 | Nolan | Oct. 29, 1907 |
| 1,083,467 | Sloan | Jan. 6, 1914 |
| 1,768,487 | Remington | June 24, 1930 |
| 1,834,368 | Arbuckle | Dec. 1, 1931 |
| 1,907,976 | Jones | May 9, 1933 |
| 1,909,469 | Hubbard | May 16, 1933 |
| 1,910,237 | Cadwell | May 23, 1933 |
| 1,987,666 | Carlson | Jan. 15, 1935 |
| 2,347,196 | Hulman | Apr. 25, 1944 |

FOREIGN PATENTS

| Number | Country | Date |
| --- | --- | --- |
| 8,262 | Great Britain | 1891 |